United States Patent
Niehaus et al.

(10) Patent No.: US 11,084,328 B2
(45) Date of Patent: Aug. 10, 2021

(54) TIRE REINFORCEMENT

(71) Applicant: The Goodyear Tire & Rubber Company, Akron, OH (US)

(72) Inventors: Taylor David Niehaus, Akron, OH (US); James Gregory Gillick, Akron, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 404 days.

(21) Appl. No.: 16/204,384

(22) Filed: Nov. 29, 2018

(65) Prior Publication Data

US 2020/0171886 A1 Jun. 4, 2020

(51) Int. Cl.
*B60C 9/26* (2006.01)
*B60C 9/22* (2006.01)
*B60C 9/02* (2006.01)

(52) U.S. Cl.
CPC .............. *B60C 9/263* (2013.01); *B60C 9/22* (2013.01); *B60C 9/023* (2013.01); *B60C 2009/2242* (2013.01)

(58) Field of Classification Search
CPC ........... B60C 9/263; B60C 9/22; B60C 9/023; B60C 9/005; B29C 70/22; D03D 15/08
See application file for complete search history.

(56) References Cited

U.S. PATENT DOCUMENTS

| | | | |
|---|---|---|---|
| 3,939,893 A | 2/1976 | Schmidt | |
| 4,635,696 A | 1/1987 | Gasowski et al. | |
| 5,221,383 A | 6/1993 | Horikawa et al. | |
| 5,223,060 A | 6/1993 | Imamiya et al. | |
| 5,584,169 A | 12/1996 | Ikehara | |
| 5,609,701 A | 3/1997 | Soderberg et al. | |
| 5,718,783 A | 2/1998 | Ikehara | |
| 5,720,322 A | 2/1998 | Soderberg et al. | |
| 5,858,147 A | 1/1999 | Goettsch | |
| 6,742,547 B2 | 6/2004 | Bryn et al. | |
| 6,892,766 B2 | 5/2005 | Bryn et al. | |
| 9,725,833 B2 | 8/2017 | Hasko et al. | |
| 2002/0043329 A1 | 4/2002 | Suda | |
| 2002/0134482 A1 | 9/2002 | Takagi | |
| 2004/0242096 A1 | 12/2004 | Prakash | |
| 2005/0205191 A1 | 9/2005 | Suzuki | |

(Continued)

FOREIGN PATENT DOCUMENTS

DE 102016224839 A1 6/2018
EP 1288357 A1 3/2003

(Continued)

OTHER PUBLICATIONS

European Search Report for Serial No. EP19210012 dated Apr. 20, 2020.

*Primary Examiner* — Jacob T Minskey
*Assistant Examiner* — Virak Nguon
(74) *Attorney, Agent, or Firm* — Robert N. Lipcsik

(57) ABSTRACT

A reinforcement structure for a polymer ply includes a plurality of flat woven cords. Each flat woven cord has a width between 0.5 mm and 1.6 mm and a thickness between 0.2 mm and 0.8 mm thereby producing the reinforcement structure with an overall width between 25.0 mm and 26.0 mm. Each flat woven cord includes materials with melting points between 130° C. and 230° C.

1 Claim, 3 Drawing Sheets

(56) References Cited

U.S. PATENT DOCUMENTS

| | | | |
|---|---|---|---|
| 2005/0269015 A1* | 12/2005 | Tanaka | B29D 30/38 |
| | | | 156/134 |
| 2009/0107609 A1 | 4/2009 | Westgate et al. | |
| 2010/0065179 A1* | 3/2010 | Imhoff | D03D 13/008 |
| | | | 152/526 |
| 2010/0108218 A1 | 5/2010 | Lamontia et al. | |
| 2010/0108225 A1 | 5/2010 | Lamontia et al. | |
| 2010/0108231 A1 | 5/2010 | Lamontia et al. | |
| 2012/0214372 A1* | 8/2012 | Li | C08L 21/02 |
| | | | 442/59 |
| 2013/0146199 A1 | 6/2013 | Westgate et al. | |
| 2013/0146200 A1 | 6/2013 | Westgate et al. | |
| 2014/0360648 A1 | 12/2014 | Assaad et al. | |
| 2015/0064438 A1 | 3/2015 | McNeil et al. | |
| 2017/0072747 A1* | 3/2017 | Aksoy | B60C 9/2204 |

FOREIGN PATENT DOCUMENTS

| | | | | |
|---|---|---|---|---|
| EP | 2995706 A1 * | 3/2016 | | B60C 15/0653 |
| JP | H10315708 A | 12/1998 | | |
| JP | 2006248023 | 9/2006 | | |

* cited by examiner

TIRE REINFORCEMENT

FIELD OF THE INVENTION

The present invention relates to reinforcement for tires and, in particular, to lightweight reinforcement for pneumatic tires, such as aircraft tires.

BACKGROUND OF THE INVENTION

Reinforcing belt structures in tires are sometimes subject to a phenomenon known as "belt edge separation". Belt edge separation occurs when the axial edges of the belt plies become displaced from their preferred positions during operation of the tire and thus become separated from the underlying carcass-reinforcing ply, an adjacent belt ply, or overlying tread material.

DEFINITIONS

The following definitions are controlling for the present invention.

"Axial" and "Axially" means the lines or directions that are parallel to the axis of rotation of the tire.

"Axially inward" means in an axial direction toward the equatorial plane.

"Axially outward" means in an axial direction away from the equatorial plane.

"Bead" or "bead core" generally means that part of the tire comprising an annular tensile member of radially inner beads that are associated with holding the tire to the rim.

"Belt structures" or "reinforcement belts" or "belt package" means at least two annular layers or plies of parallel cords, woven or unwoven, underlying the tread, unanchored to the bead, and having both left and right cord angles in the range from 18 degrees to 30 degrees relative to the equatorial plane of the tire.

"Carcass" means the tire structure apart from the belt structure, tread, under tread over the plies, but including the beads.

"Circumferential" most often means circular lines or directions extending along the perimeter of the surface of the annular tread perpendicular to the axial direction; it can also refer to the direction of the sets of adjacent circular curves whose radii define the axial curvature of the tread, as viewed in cross section.

"Directional tread pattern" means a tread pattern designed for specific direction of rotation.

"Equatorial plane", or "Mid-circumferential plane", means the plane perpendicular to the tire's axis of rotation and passing through the center of its tread; or the plane containing the circumferential centerline of the tread.

"Flat" means having a width greater than a thickness.

"Footprint" means the contact patch or area of contact of the tire tread with a flat surface under normal load pressure and speed conditions.

"Groove" means an elongated void area in a tread that may extend circumferentially or laterally in the tread in a straight, curved or zigzag manner. It is understood that all groove widths are measured perpendicular to the centerline of the groove.

"Lateral" means a direction going from one sidewall of the tire towards the other sidewall of the tire.

"Net to gross" means the ratio of the net ground contacting tread surface to the gross area of the tread including the ground contacting tread surface and void spaces comprising grooves, notches and sipes.

"Notch" means a void area of limited length that may be used to modify the variation of net to gross void area at the edges of blocks.

"Ply" means a cord-reinforced layer of rubber coated radially deployed or otherwise parallel cords.

"Radial" and "radially" mean directions radially toward or away from the axis of rotation of the tire.

"Radial ply tire" means a belted or circumferentially-restricted pneumatic tire in which at least one ply has cords which extend from bead to bead are laid at cord angles between 65 degrees and 90 degrees with respect to the equatorial plane of the tire.

"Saturated" means not enough room between adjacent primary windings of a cable such that additional windings cannot be wound between the primary windings.

"Shoulder" means the upper portion of sidewall just below the tread edge.

"Sidewall" means that portion of a tire between the tread and the bead.

"Sipe" means a groove having a width in the range of 0.2 percent to 0.8 percent of the tread width. Sipes are typically formed by steel blades having a 0.4 to 1.6 mm, inserted into a cast or machined mold.

"Tangential" and "tangentially" refer to segments of circular curves that intersect at a point through which can be drawn a single line that is mutually tangential to both circular segments.

"Tread" means the ground contacting portion of a tire.

"Tread width" (TW) means the greatest axial distance across the tread, when measured (using a footprint of a tire,) laterally from shoulder to shoulder edge, when mounted on the design rim and subjected to a specified load and when inflated to a specified inflation pressure for said load.

"Void space" means areas of the tread surface comprising grooves, notches and sipes.

These and other features of the present invention can be better understood from the following detailed description of the examples, when read in conjunction with the accompanying drawings.

SUMMARY OF INVENTION

A reinforcement structure for a polymer ply in accordance with the present invention includes a plurality of flat woven cords. Each flat woven cord has a width between 0.5 mm and 1.6 mm and a thickness between 0.2 mm and 0.8 mm thereby producing the reinforcement structure with an overall width between 25.0 mm and 26.0 mm. Each flat woven cord includes materials with melting points between 130° C. and 230° C.

According to another aspect of the reinforcement structure, each flat woven cord comprises warp cords of nylon or PLA.

According to still another aspect of the reinforcement structure, each flat woven cord comprises warp cords of aramid or UHMWP.

According to yet another aspect of the reinforcement structure, each flat woven cord comprises weft cords of nylon or PLA.

According to still another aspect of the reinforcement structure, each flat woven cord comprises weft cords of aramid or UHMWP.

A tire in accordance with the present invention includes a tread portion, an annular belt structure underlying the tread portion, the annular belt structure including a pair of radially superposed belt plies; and a woven reinforcement structure embedded in an elastomeric substance prior to assembly of the tire. The woven reinforcement structure has a plurality of flat strips each having warp cords extending in a circumferential direction of the tire and weft cords extending transverse to the circumferential direction.

According to another aspect of the tire, each strip has a width between 1.3 mm and 1.6 mm, or 0.5 mm and 1.6 mm and a thickness between 0.2 mm and 0.8 mm, or 0.4 mm and 0.6 mm.

According to still another aspect of the tire, each strip has the woven reinforcement structure has a width between 25.0 mm and 26.0 mm.

According to yet another aspect of the tire, each strip comprises materials with melting points between 130° C. and 230° C., or 130° C. and 175° C.

According to still another aspect of the tire, each strip has warp cords of nylon and/or PLA.

According to yet another aspect of the tire, each strip has warp cords of aramid and/or UHMWP.

According to still another aspect of the tire, each strip has weft cords of nylon and/or PLA.

According to yet another aspect of the tire, each strip has weft cords of aramid and/or UHMWP.

According to still another aspect of the tire, each strip has a width between 1.3 mm and 1.6 mm, or 0.5 mm and 1.6 mm.

According to yet another aspect of the tire, each strip has a thickness between 0.4 mm and 0.6 mm, 0.2 mm and 0.8 mm.

According to still another aspect of the tire, each strip has the overall woven reinforcement structure has a width between 25.0 mm and 26.0 mm, or 25.4 mm.

According to yet another aspect of the tire, each strip has materials with melting points between 130° C. and 230° C., or 130° C. and 175° C.

BRIEF DESCRIPTION OF THE DRAWINGS

The present invention will be better understood on reading the following description, which is given solely by way of nonlimiting example, with reference to the drawings, in which.

DETAILED DESCRIPTION OF EXAMPLES OF THE PRESENT INVENTION

Figure 1:
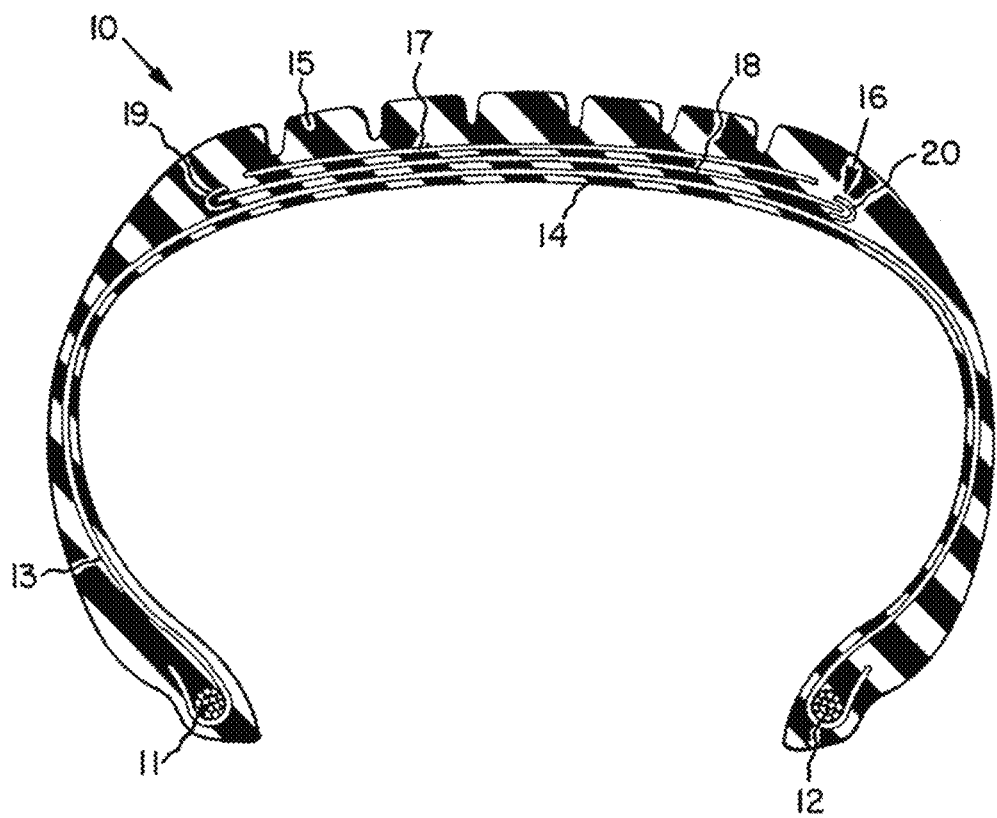
FIG. 1 is a schematic radial cross-sectional view of an example tire for use with the present invention.

Referring to FIG. 1, there is shown a radial cross-sectional view of an example tire 10 for use with the present invention. The tire 10 may have an annular carcass including a pair of annular beads 11,12 and a carcass-reinforcing ply 13 extending from one bead to the other. The carcass may have a radially outer crown portion 14 with a circumferentially extending tread portion 15. An annular belt structure 16 may underlie the tread portion 15 and be disposed between the tread portion 15 and the crown portion 14 of the carcass. The crown portion 14 of the carcass may have substantial rigidity or resistance to deformation in the circumferential and axial directions to satisfy the tread wear and handling requirements of the tire 10. Because the reinforcing cords of the carcass-reinforcing ply 13 may not substantially reinforce the crown portion 14 in a circumferential direction, the tire 10 may be provided with the belt structure 16.

The annular belt structure 16 may be comprised of a plurality of radially superposed belt plies 17,18 of parallel reinforcing cords, such as steel, glass, or other suitable material, embedded in an elastomeric substance, such as natural or synthetic rubber. As used herein, "plurality" means more than one. The reinforcing cords of the belt plies 17, 18 may be oriented at a much lower angle, for example, between about 15 to about 35 degrees, with respect to the mid-circumferential plane of the tire 10 than the reinforcing cords of the carcass-reinforcing ply 13. The belt plies 17, 18 may have the same axial width or different axial widths.

The annular belt structure 16 may further include a pair of axially spaced apart edge strips 19, 20 of square woven fabric with only a portion, such as substantially one-half of the unfolded axial width, of each edge strip being disposed between the pair of adjacent belt plies 17, 18. Depending upon the size of the tire 10, the edge strips 19, 20 may have unfolded axial widths of between about 15 to about 40 percent of the axial width of the widest belt ply (18 in FIG. 1) of the annular belt structure 16.

The edge strips 19, 20 may be comprised of square woven fabric. As used herein, and in the appended claims, "square woven fabric" may refer to a plurality of textile cords that are interwoven or knit such that a first portion of the textile cords extend parallel to one another in a first direction while the remainder of the textile cords extend parallel to one another in a second direction that is substantially perpendicular to the first direction. As used herein, and in the appended claims, "interwoven" may refer to fabric produced by interlacing two cords so that they cross each other at right angles. "Knit" may refer to fabric produced by interlocking a series of loops of one or more cords. As used herein, and in the appended claims, "textile cords" may refer to any fiber, filament, and/or yarn of the type used for reinforcing tires, such as the tire 10. The textile cords of the square woven fabric may be nylon, (either type 6 or type 6,6), but may be polyester and/or other suitable material.

Figure 2:
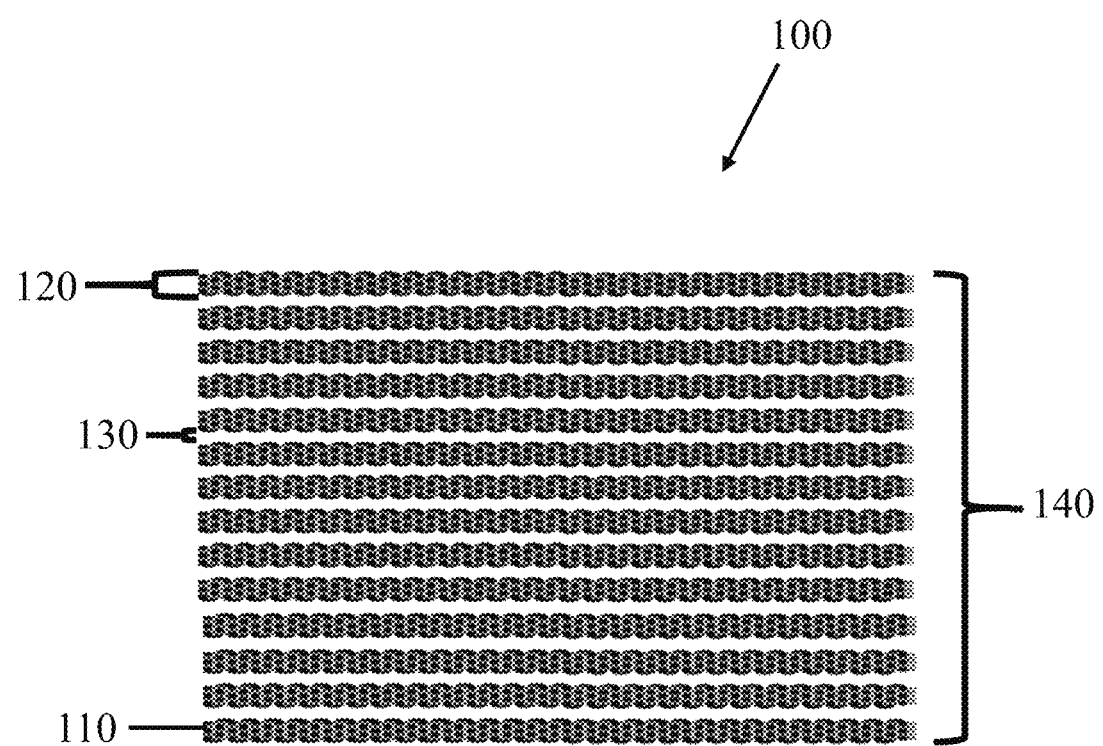
FIG. 2 is a schematic orthogonal view of an example reinforcement in accordance with the present invention.
Figure 3:
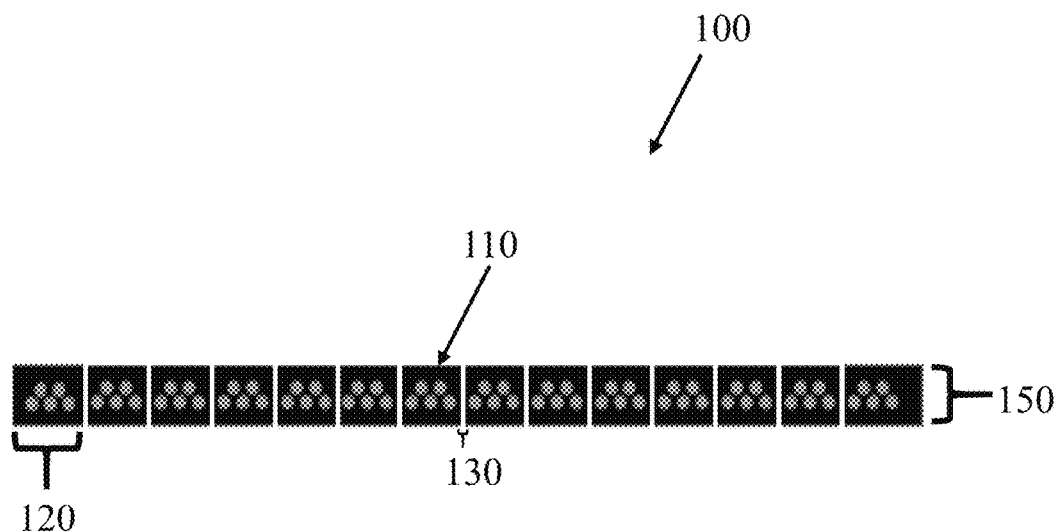
FIG. 3 is a schematic cross-sectional view of the example reinforcement of FIG. 2.

FIGS. 2 & 3 show an orthogonal, or plan, view and a cross-sectional view of a reinforcement structure 100 in accordance with the present invention. Such a structure 100 may be used, partially or completely for elements 11, 12, 13, 16, 17, 18, 19, and/or 20 of the tire 10. Emerging manufacturing techniques have demonstrated the ability to weave at relatively narrow widths (e.g., as narrow as 0.5 mm) to produce rubber reinforcing cords from a woven structure 100 of multifilament yarns, twisted yarns, and/or twisted cords. Such a woven structure 100 may be plain weave, twill weave, LENO weave, and/or three-dimensional (hereinafter "3D") weave.

For a 3D weave, the woven structure 100 may have complex geometrical cross sections and/or a hollow center. In weaving, warp cords are the cords running a single direction, such as lengthwise. Weft cords are woven over and under the warp cords in another direction, such as perpendicular to the single direction. The woven structure 100 may range from "tight", or "closed", weave (e.g., for efficient packing of yarn filaments and maximize strength) to "loose", or "open", weave (e.g., for suitable compression resistance and increased rubber penetration). Warp yarns/filaments may be untwisted and/or lightly twisted to maximize strength or twisted yarn or warp tire cords to maximize compression resistance. Warp tire cord may have one or more materials to accomplish suitable cord properties. Weft materials may be the same material or materials as the warp material(s) or a lighter material to facilitate an "open" weave configuration. Weft tire cords may be different materials from warp tire cords to accomplish suitable weave properties.

Both warp and weft materials may be compositions not conventionally used in tire manufacture and/or construction. For example, materials with melting points below normal use temperatures may fuse the structure 100 together during processing to produce further functional features, such as in the belt plies 17, 18. Example materials may include a polyester like polylactic acid (PLA) with melting points between 130° C. and 175° C. and/or an ultra high molecular weight polyethylene (UHMWP) with melting points between 130° C. and 230° C., or 130° C. and 136° C. Other example materials may include nylon 6,6, nylon 6, glass fiber, carbon fiber, POK fiber, and/or basalt fiber.

Thus, the woven structure 100 according to the present invention may comprise a package, or plurality, of filaments, yarns, cords, etc. secured, or "tied", together with weft filaments, yarns, and/or cords. Such a flatter woven structure 100 may have an aspect ratio greater than 1, but may not be limited to the circular/oval cross section of FIG. 4. Trapezoidal is shown in FIG. 3 while other suitable flatter shapes may include obround, rectangular, polygon, etc.

Such a "fabric-cord" structure 100 may be dipped in an adhesive such as resorcinol formaldehyde latex (RFL). The RFL formulation may depend on the warp/weft material(s) used and may be processed with an isocyanate bath, "filament fusing", process followed by a polyester top layer followed by the RFL adhesive.

The structure 100 may be utilized for plies or other components where compression is present to reduce gauge. Further, the strength of high modulus fibers, such as aramid, may be used without a loss in strength observed during twisting for conventional tire cord constructions. The structure may also increase in-plane stiffness to improve handling without sacrificing rolling resistance.

The mechanical interlacing of the weaving patterns of the structure 100 may group the yarns/filaments together. The narrow, woven cord 110 may produce a fully homogeneous cross section (no distinction between the warp ends of the fabric) with a cross sectional shape such as trapezoidal (FIG. 3), circular, oval, obround, polygonal, etc. The woven construction may thereby secure the yarns/cords together.

Figure 4:
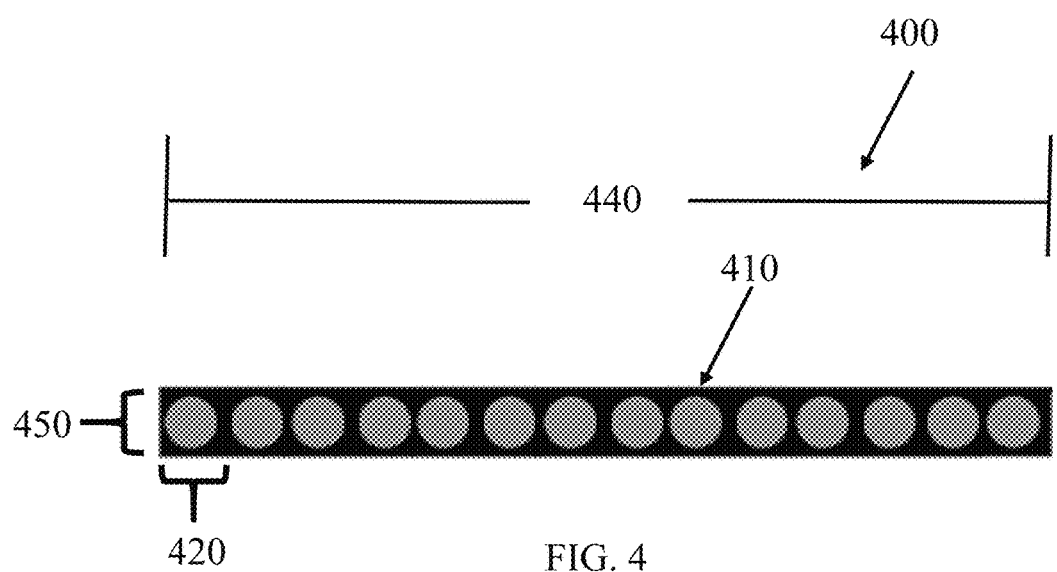
FIG. 4 is a schematic cross-sectional view of another example reinforcement.

As shown in FIGS. 2-3, a woven structure 100 in accordance with the present invention may include a plurality of flat cords 110 (e.g., between 1 and 20). The fourteen flat cords 110 each may have a 1.3 mm to 1.6 mm width 120 and a 0.3 mm to 0.8 mm spacing 130 to result in the structure 100 having a 25.4 mm overall width 140. The structure 100 and flat cords 110 may have a 0.4 mm to 0.6 mm thickness 150. The thickness 150 of the structure 100 may thereby be advantageously thinner than an equivalent conventional structure 400 (FIG. 4). The conventional structure 400 may have similar tensile strength with a width 420 of circular cords 410 equal to the width 120 of the flat cords 110 and an overall width 440 equal to the overall width 140 of the structure 100, but the thickness 450 of the conventional structure may be 1.3 mm to 1.6 mm, which is significantly thicker than the thickness 150 of the structure 100.

While certain representative details and examples have been shown for the purpose of illustrating the present invention, it will be apparent to those skilled in the art that various changes and/or modifications may be made therein without departing from the spirit or scope of the present invention as set forth by the following claims.

What is claimed:

1. A tire comprises:
a tread portion;
an annular belt structure underlying the tread portion, the annular belt structure including a pair of radially superposed belt plies; and
a woven reinforcement structure embedded in an elastomeric substance prior to the assembly of the tire, the woven reinforcement structure having a plurality of flat strips each having warp cords extending in a circumferential direction of the tire and weft cords extending transverse to the circumferential direction,
each flat strip having a width between 1.3 mm and 1.6 mm and a thickness between 0.4 mm and 0.6 mm, the woven reinforcement structure having a width between 25 mm and 26 mm, each flat strip including warp cords of aramid, each flat strip having weft cords of nylon, each flat strip having materials with melting points between 130° C. and 175° C.

* * * * *